(12) United States Patent
Vishwakarma et al.

(10) Patent No.: US 11,507,422 B2
(45) Date of Patent: Nov. 22, 2022

(54) METHOD AND SYSTEM FOR INTELLIGENTLY PROVISIONING RESOURCES IN STORAGE SYSTEMS

(71) Applicant: EMC IP Holding Company LLC, Hopkinton, MA (US)

(72) Inventors: Rahul Deo Vishwakarma, Bangalore (IN); Supriya Kannery, Bangalore (IN)

(73) Assignee: EMC IP HOLDING COMPANY LLC, Hopkinton, MA (US)

(*) Notice: Subject to any disclaimer, the term of this patent is extended or adjusted under 35 U.S.C. 154(b) by 783 days.

(21) Appl. No.: 16/529,753

(22) Filed: Aug. 1, 2019

(65) Prior Publication Data
US 2021/0034425 A1 Feb. 4, 2021

(51) Int. Cl.
| | |
|---|---|
| *G06F 9/50* | (2006.01) |
| *G06N 5/02* | (2006.01) |
| *G06N 20/00* | (2019.01) |
| *G06N 7/02* | (2006.01) |
| *G06F 12/02* | (2006.01) |
| *G06F 3/06* | (2006.01) |

(52) U.S. Cl.
CPC .......... *G06F 9/5027* (2013.01); *G06F 3/0608* (2013.01); *G06F 12/0253* (2013.01); *G06N 5/02* (2013.01); *G06N 7/02* (2013.01); *G06N 20/00* (2019.01); *G06F 9/5016* (2013.01)

(58) Field of Classification Search
None
See application file for complete search history.

(56) References Cited

U.S. PATENT DOCUMENTS

| | | | |
|---|---|---|---|
| 8,751,546 B1* | 6/2014 | Grieve | G06F 9/4843 707/813 |
| 9,460,389 B1* | 10/2016 | Botelho | G06F 12/0253 |
| 2007/0136402 A1* | 6/2007 | Grose | G06F 12/0253 |
| 2014/0344216 A1* | 11/2014 | Abercrombie | G06F 16/27 707/609 |

* cited by examiner

*Primary Examiner* — Jared I Rutz
*Assistant Examiner* — Marwan Ayash
(74) *Attorney, Agent, or Firm* — Chamberlain, Hrdlicka, White, Williams & Aughtry

(57) ABSTRACT

A method and system for intelligently provisioning resources in storage systems. Specifically, the method and system disclosed herein entail throttling the allocation of resources aiding in the performance of background service tasks on a backup storage system. That is, throughout a predicted span of a background service task, resources may be dynamically allocated towards the performance of the background service task at discrete time intervals within the predicted span, thereby improving overall system utilization.

16 Claims, 6 Drawing Sheets

METHOD AND SYSTEM FOR INTELLIGENTLY PROVISIONING RESOURCES IN STORAGE SYSTEMS

BACKGROUND

At present, the dynamic allocation of resources, in support of the execution of background service operations on storage systems, is configured manually based on user experience and expertise.

SUMMARY

In general, in one aspect, the invention relates to a method for intelligently provisioning system resources. The method includes identifying a background service task yet to be performed, predicting a background service task duration for completing the background service task, generating a forecast time-series projecting a future availability of a system resource spanning the background service task duration, and regulating, based on the forecast time-series, an allocation of the system resource in support of performing the background service task.

In general, in one aspect, the invention relates to a system. The system includes a computer processor, and a dynamic resource allocator executing on the computer processor, and configured to identify a background service task yet to be performed, obtain a prediction of a background service task duration for completing the background service task, generate a forecast time-series projecting a future availability of a system resource spanning the background service task duration, and regulate, based on the forecast time-series, an allocation of the system resource in support of performing the background service task.

In general, in one aspect, the invention relates to a non-transitory computer readable medium (CRM). The non-transitory CRM includes computer readable program code, which when executed by a computer processor, enables the computer processor to identify a background service task yet to be performed, predict a background service task duration for completing the background service task, generate a forecast time-series projecting a future availability of a system resource spanning the background service task duration, and regulate, based on the forecast time-series, an allocation of the system resource in support of performing the background service task.

Other aspects of the invention will be apparent from the following description and the appended claims.

DETAILED DESCRIPTION

Specific embodiments of the invention will now be described in detail with reference to the accompanying figures. In the following detailed description of the embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In the following description of FIGS. 1-6, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment which may be implemented in addition to, in conjunction with, or in place of the embodiments described with regard to a corresponding like-named component in any other figure.

Throughout the application, ordinal numbers (e.g., first, second, third, etc.) may be used as an adjective for an element (i.e., any noun in the application). The use of ordinal numbers is not to necessarily imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and a first element may encompass more than one element and succeed (or precede) the second element in an ordering of elements.

In general, embodiments of the invention relate to a method and system for intelligently provisioning resources in storage systems, Specifically, one or more embodiments of the invention entails throttling the allocation of resources aiding in the performance of background service tasks on a backup storage system. That is, throughout a predicted span of a background service task, resources may be dynamically allocated towards the performance of the background service task at discrete time intervals within the predicted span, thereby improving overall system utilization.

Figure 1:
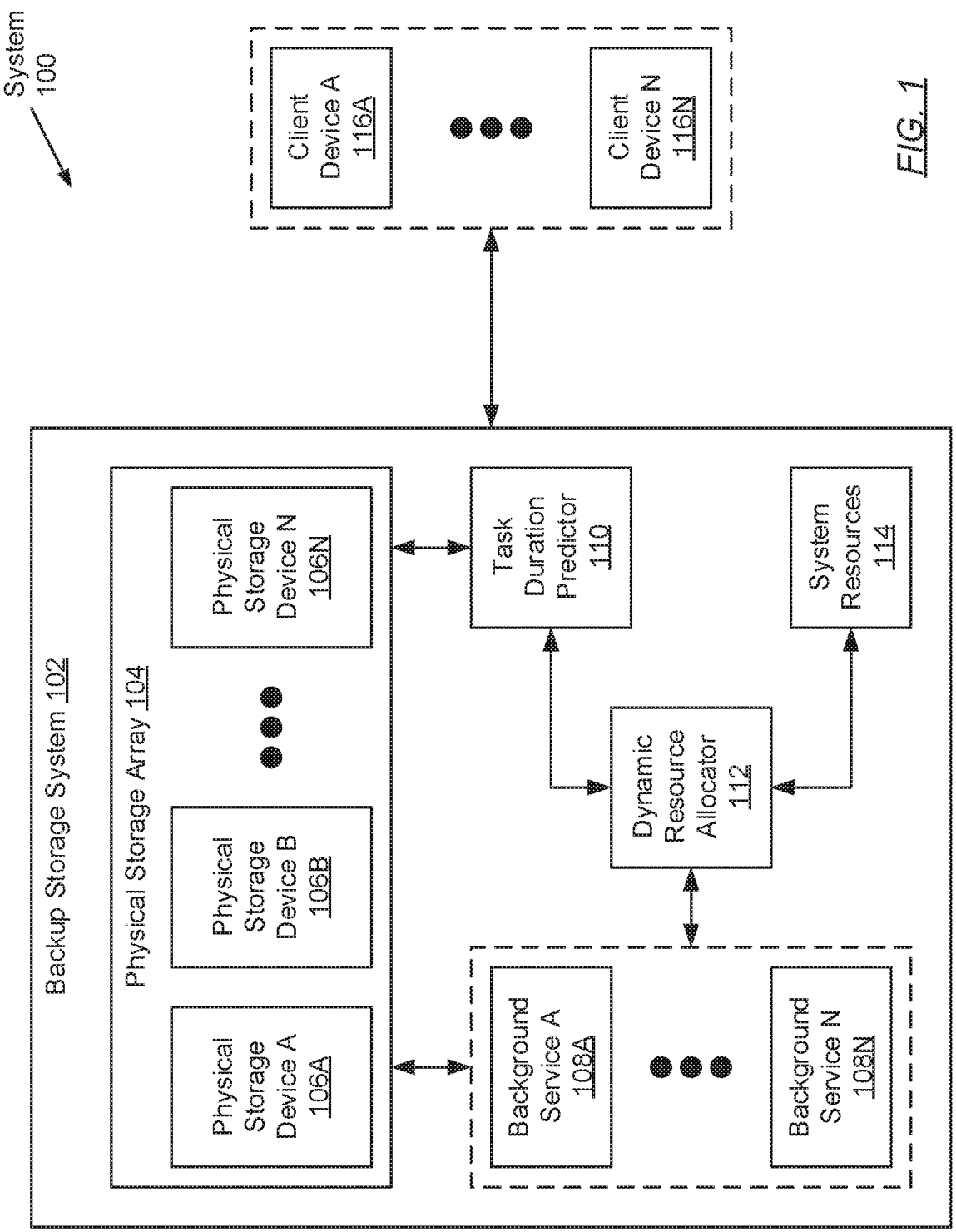
FIG. 1 shows a system in accordance with one or more embodiments of the invention.

FIG. 1 shows a system in accordance with one or more embodiments of the invention. The system (100) may include a backup storage system (102) operatively connected to one or more client devices (116A-116N). Each of these system (100) components is described below.

In one embodiment of the invention, the above-mentioned system (100) components may operatively connect to one another through a network (not shown) (e.g., a local area network (LAN), a wide area network (WAN) such as the Internet, a mobile network, etc.). The network may be implemented using any combination of wired and/or wireless connections. Further, the network may encompass various interconnected, network-enabled subcomponents (or systems) (e.g., switches, routers, gateways, etc.) that may facilitate communications between the above-mentioned system (100) components. Moreover, the above-mentioned system (100) components may communicate with one another using any combination of wired and/or wireless communication protocols.

In one embodiment of the invention, the backup storage system (102) may represent a data backup, archiving, and/or disaster recovery storage system. The backup storage system (102) may be implemented using one or more servers (not shown). Each server may be a physical server, which may reside in a datacenter, or a virtual server, which may reside in a cloud computing environment. Additionally or alternatively, the backup storage system (102) may be implemented using one or more computing systems similar to the exemplary computing system shown in FIG. 6. Furthermore, the backup storage system (102) may include a physical storage array (104), one or more background services (108A-108N), a task duration predictor (110), a dynamic resource allocator (112), and system resources (114). Each of these backup storage system (102) subcomponents is described below.

In one embodiment of the invention, the physical storage array (104) may refer to a collection of one or more physical storage devices (106A-106N) on which various forms of data—e.g., backup copies of data found on the client device(s) (116A-116N)—may be consolidated. Each physical storage device (106A-106N) may encompass non-transitory computer readable storage media on which data may be stored in whole or in part, and temporarily or permanently. Further, each physical storage device (106A-106N) may be designed and configured based on a common or different storage device technology—examples of which may include, but are not limited to, flash based storage devices, fibre channel (FC) based storage devices, serial-attached small computer system interface (SCSI) (SAS) based storage devices, and serial advanced technology attachment (SATA) storage devices. Moreover, in one embodiment of the invention, any subset or all physical storage device(s) (106A-106N) may be implemented using persistent (i.e., non-volatile) storage. Examples of persistent storage may include, but are not limited to, optical storage, magnetic storage, NAND Flash Memory, NOR Flash Memory, Magnetic Random Access Memory (M-RAM), Spin Torque Magnetic RAM (ST-MRAM), Phase Change Memory (PCM), or any other storage defined as non-volatile Storage Class Memory (SCM).

In one embodiment of the invention, a background service (108A-108N) may refer to a computer program that may execute on the underlying hardware of the backup storage system (102). Specifically, a background service (108A-108N) may be designed and configured to perform one or more tasks or operations in the background of the backup storage system (102). That is, a background service (108A-108N) may perform one or more operations, which is/are unnoticeable to a backup storage system (102) user and/or administrator and, subsequently, require little or no user interaction. Operations, performed by a background service (108A-108N), may be carried out based on a prescribed task schedule or on-demand, and may be configured and/or controlled (e.g., started, paused, resumed, or stopped) by way of other computer programs executing on the background storage system (102) such as, for example, an operating system (OS) (not shown) or a background service manager (not shown). Examples of a background service (108A-108N) may include, but are not limited to, a garbage collection service, a data migration (i.e., to a cloud computing environment) service, a data replication (i.e., between physical storage devices (106A-106N)) service, an update download service, etc.

In one embodiment of the invention, the task duration predictor (110) may refer to a computer program that may execute on the underlying hardware of the backup storage system (102). Specifically, the task duration predictor (110) may be designed and configured to predict a duration (or length of time) that may be consumed, by a background service (108A-108N), to complete a yet-to-be-performed task or operation. To that extent, the task duration predictor (110) may perform any subset or all of the flowchart steps outlined in FIG. 3. Further, the prediction of any background service task duration may entail generating and applying a random forest regression based predictive model using sets of features (i.e., individual, measurable properties or variables significant to the performance and length of time consumed to complete a given background service task). By way of an example, the prediction of the duration of garbage collection on backup storage systems (e.g., the backup storage system (102)), using random forest regression, is described in further detail in U.S. Pat. No. 9,460,389 (hereinafter referred to as the '389 patent), filed on May 31, 2013, which is hereby referenced and incorporated in its entirety.

In one embodiment of the invention, the dynamic resource allocator (112) may refer to a computer program that may execute on the underlying hardware of the backup storage system (102). Specifically, the dynamic resource allocator (112) may be designed and configured to allocate one or more system resources (114), dynamically throughout the predicted duration of a given background service task, to a given background service (108A-108N) responsible for performing the given background service task. To that extent, the dynamic resource allocator (112) may perform any subset or all of the flowchart steps outlined in FIGS. 2-5. Further, allocation of system resources (114) may be regulated based on a projected availability of the system resources (114) throughout the predicted duration of the given background service task, which is described in further detail below.

In one embodiment of the invention, a system resource (114) may refer to any physical or virtual component of limited availability within the backup storage system (102). By way of an example, a system resource (114) may include, but is not limited to, a compute resource i.e., a measurable quantity of a compute-relevant resource type that can be requested, allocated, and consumed. More specifically, a compute resource may pertain to a physical device hardware), a logical intelligence (i.e., software), or a combination thereof, which may provide computing and/or processing functionality on the backup storage system (102). Central processing units (CPU), graphics processing units (GPU), and/or memory (e.g., random access memory (RAM)) may exemplify compute resources residing on the backup storage system (102). System resources (114) may not be limited to compute resources and/or the aforementioned examples of compute resources. For example, system resources (114) may further include, but are not limited to, storage resources (e.g., physical storage device (106A-106N) capacity), virtualization resources (e.g., virtual machine (not shown) processing), and network resources (e.g., bandwidth).

In one embodiment of the invention, a client device (116A-116N) may represent any physical appliance or computing system designed and configured to receive, generate, process, store, and/or transmit data, as well as to provide an environment in which one or more computer programs may execute thereon. The computer programs may, for example, implement large-scale and complex data processing; or implement one or more services offered locally or over a network. Further, in providing an execution environment for any computer programs installed thereon, a client device (116A-116N) may include and allocate various resources (e.g., computer processors, memory, storage, virtualization, network bandwidth, etc.), as needed, to the computer programs and the tasks (or processes) instantiated thereby. One of ordinary skill will appreciate that a client device (116A-116N) may perform other functionalities without departing from the scope of the invention. Examples of a client device (116A-116N) may include, but are not limited to, a desktop computer, a laptop computer, a tablet computer, a server, a mainframe, or any other computing system similar to the exemplary computing system shown in FIG. 6.

While FIG. 1 shows a configuration of components, other system configurations may be used without departing from the scope of the invention. For example, the system (100) may further include one or more additional backup storage systems (not shown), which may operatively connect to the client device(s) (116A-116N).

Figure 2:
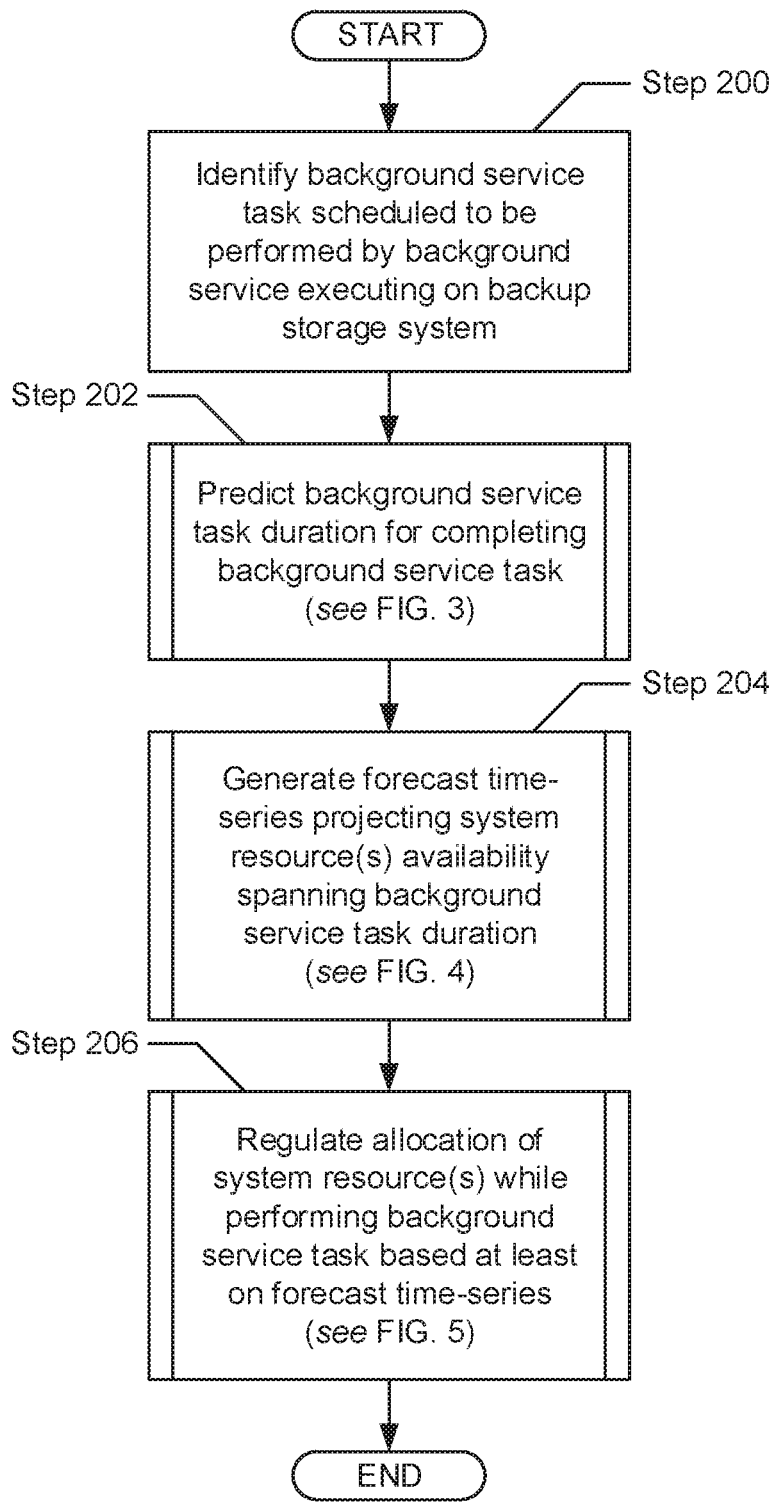
FIG. 2 shows a flowchart describing a method for intelligently provisioning resources in support of background service tasks in accordance with one or more embodiments of the invention.

FIG. 2 shows a flowchart describing a method for intelligently provisioning resources in support of background service tasks in accordance with one or more embodiments of the invention. The various steps outlined below may be performed by the dynamic resource allocator residing on the backup storage system (see e.g., FIG. 1). Further, while the various steps in the flowchart are presented and described sequentially, one of ordinary skill will appreciate that some or all steps may be executed in different orders, may be combined or omitted, and some or all steps may be executed in parallel.

Turning to FIG. 2, in Step 200, a background service task is identified. In one embodiment of the invention, the background service task may represent a yet-to-be performed (i.e., scheduled or on-demand) operation that is to be carried out by an appropriate background service executing on the backup storage system. Examples of the background service task may include, but are not limited to, a garbage collection operation, a data migration operation, a data replication operation, and an update download operation.

In Step 202, a background service task duration is predicted. In one embodiment of the invention, the background service task duration may refer to a length or amount of time required for the background service task (identified in Step 200) to be completed (i.e., time to completion). Prediction of the background service task duration is described in further detail below with respect to FIG. 3.

In Step 204, a forecast time-series is generated. In one embodiment of the invention, the forecast time-series may represent a series of values indexed in a specified future time order, which spans the background service task duration (predicted in Step 202). Further, each value may capture an amount or percentage of backup storage system resources projected to be available at a corresponding future point of time. In one embodiment of the invention, when multiple backup storage system resource types are considered, a forecast time-series may be generated for each backup storage system resource type that may be considered. Generation of the forecast time-series is described in further detail below with respect to FIG. 4.

In Step 206, an allocation of backup storage system resources is regulated (or throttled) based at least on the forecast time-series (generated in Step 204). That is, in one embodiment of the invention, while the background service task (identified in Step 200) executes, backup storage system resources may be dynamically allocated, in accordance and proportional to the availability of backup storage system resources projected by the forecast time-series, towards supporting the execution of the background service task, Throttling of backup storage system resources allocation is described in further detail below with respect to FIG. 5.

Figure 3:
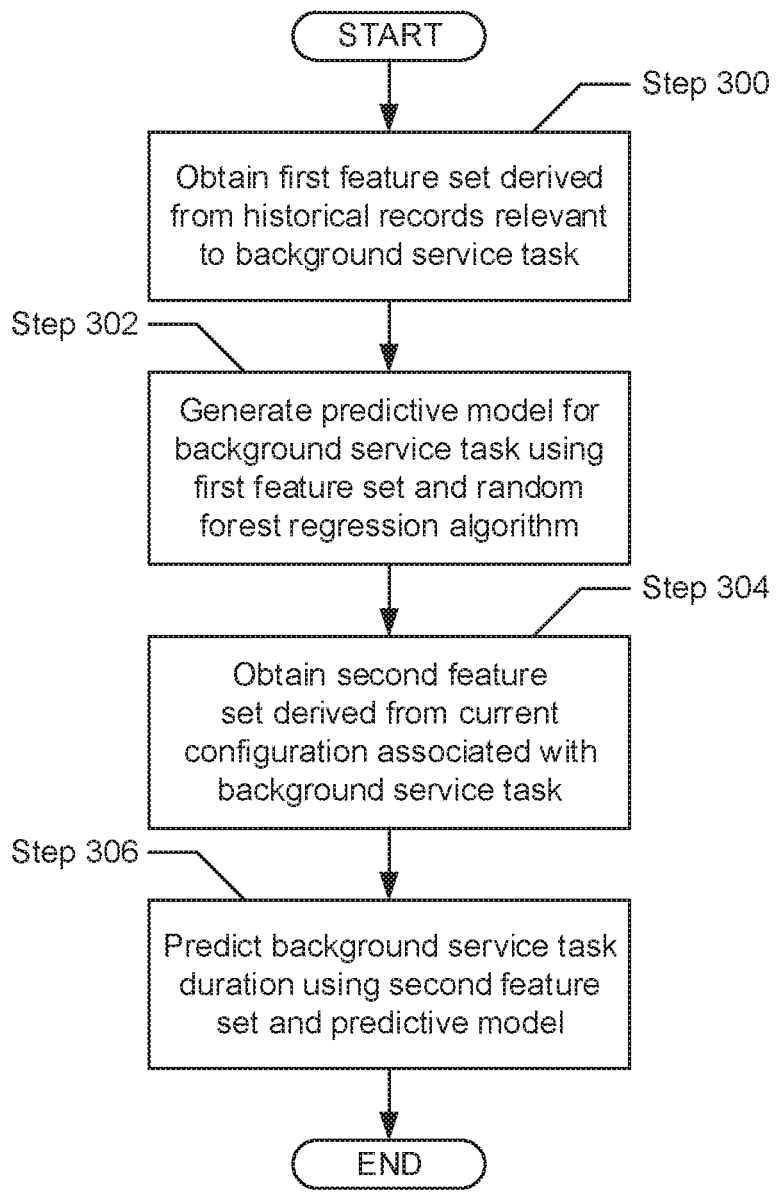
FIG. 3 shows a flowchart describing a method for predicting a background service task duration in accordance with one or more embodiments of the invention.

FIG. 3 shows a flowchart describing a method for predicting a background service task duration in accordance with one or more embodiments of the invention. The various steps outlined below may be performed by the task duration predictor residing on the backup storage system (see e.g., FIG. Further, while the various steps in the flowchart are presented and described sequentially, one of ordinary skill will appreciate that some or all steps may be executed in different orders, may be combined or omitted, and some or all steps may be executed in parallel.

Turning to FIG. 3, in Step 300, one or more first feature sets is/are obtained. In one embodiment of the invention, a feature set may refer to a collection (e.g., array or vector) of values—each representative of a different feature pertinent to the performance of any given background service task (described above—see e.g., FIG. 2) for a given point of time. A feature, in turn, may represent an individual measurable property or attribute reflective of the configuration and/or operating state of the backup storage system. The value at a given point of time, for each feature, may be collected periodically (or on-demand) by one or more physical and/or logical sensors integrated throughout the backup storage system.

In one embodiment of the invention, the aggregation of these values for any given feature, spanning multiple sampling points, may be referred herein as statistical data. By way of examples, these statistical data may include, but are not limited to, measurements or metrics relevant to backup storage system resource (e.g., compute, storage, virtualization, network, etc.) availability and utilization, measurements or metrics relevant to the input, execution, and output of a given background service task (e.g. garbage collection, data migration, data replication, update download, etc.), information describing the general configuration of the backup storage system, information describing the configuration of a given background service task, etc. Furthermore, the first feature set(s) may be derived from maintained histories (i.e., historical records) of statistical data.

In Step 302, a predictive model for the background service task is generated. In one embodiment of the invention, the predictive model may refer to an optimized statistical and/or machine learning model directed to forecasting outcomes (e.g., background service task durations) given a set of predictors (e.g., a feature set). Further, generation of the predictive model may entail an iterative learning (i.e., training and/or validation) process involving the first feature set(s) (obtained in Step 300) in conjunction with a known forecasting algorithm such as, for example, a random forest regression algorithm Random forest regression refers to an ensemble technique, which constructs multiple decision trees that are each trained using a different data sample (e.g., a different first feature set) and applies bootstrap aggregation (or bagging), to produce a mean prediction (e.g., a mean prediction of a background service task duration) of the individual decision trees, Details outlining the implementation of random forest regression to predict, for example, times to completion of garbage collection operations may be disclosed in the above-referenced '389 patent.

In Step 304, a second feature set is obtained. In one embodiment of the invention, whereas the first feature set(s) (obtained in Step 300) may be derived from historical (or past) values representative of a collection of features, the second feature set may be derived from more recent or current, observed values of the collection of features. Accordingly, each first feature set may represent a separate training data set for optimizing the predictive model (generated in Step 302), while the second feature set may represent the testing data set through which a prediction may be produced.

Figure 4:
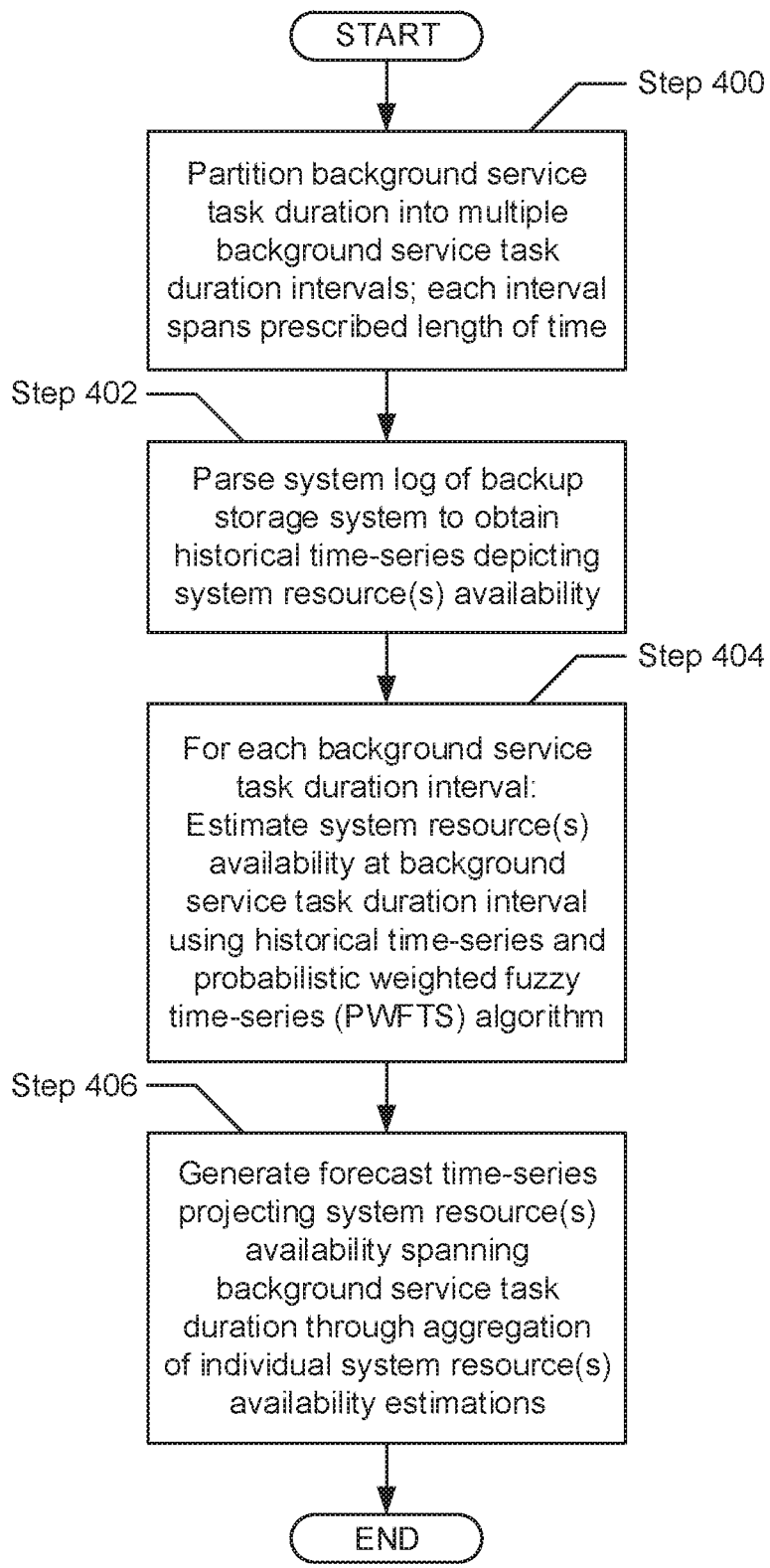
FIG. 4 shows a flowchart describing a method for generating a forecast time-series in accordance with one or more embodiments of the invention.

In Step 306, a background service task duration is predicted. In one embodiment of the invention, the background service task duration may refer to a length or amount of time required for the background service task to be completed (i.e., time to completion). Further, prediction of the background service task duration may entail processing the second feature set (obtained in Step 304) using the predictive model (generated in Step 302), FIG. 4 shows a flowchart describing a method for generating a forecast time-series in accordance with one or more embodiments of the invention. The various steps outlined below may be performed by the dynamic resource allocator residing on the backup storage system (see e.g., FIG. 1). Further, while the various steps in the flowchart are presented and described sequentially, one of ordinary skill will appreciate that some or all steps may be executed in different orders, may be combined or omitted, and some or all steps may be executed in parallel.

Turning to FIG. 4, in Step 400, a background service task duration (described above—see e.g., FIG. 2) is partitioned. Specifically, in one embodiment of the invention, the background service task duration may be segmented into multiple background service task duration intervals. Each background service task duration interval may span a length of time (e.g., five minutes, ten minutes, thirty minutes, one hour, etc.) prescribed by a backup storage system administrator, or consistent with a periodicity in which statistical data (described above—see e.g., FIG. 3) may be collected on the backup storage system.

In Step 402, a system log of the backup storage system is parsed. In one embodiment of the invention, the system log may represent a data object (e.g., a file, a table, a structure of arrays, a composite variable, etc.) that chronologically documents or records the utilization of backup storage system resources at prescribed sampling intervals. That is, the system log may maintain a point-in-time utilization history of one or more backup storage system resource types (e.g., compute resources, storage resources, virtualization resources, network resources, etc.). Further, the point-in-time utilization history of each backup storage system resource type may be broken down into various categories or features—e.g., a percentage of the resource type consumed for user-pertinent operations (e.g., data backup operations, data restore operations, data deduplication operations, etc.), a percentage of the resource type consumed for system-pertinent operations (e.g., background service tasks, etc.), a percentage of the resource type not utilized or idled, etc.

In one embodiment of the invention, in parsing the system log, a historical time-series may be obtained. The historical time-series may represent a series of values indexed in a specified past time order, which may span any given length of the point-in-time utilization history captured in the system log. Further, each value may depict an amount or percentage of backup storage system resources recorded to have been available at a corresponding past point of time. The recorded availability of backup storage system resources may be derived from the idle (i.e., not utilized) percentage history of a selected resource type. Alternatively, when multiple resource types are considered, a historical time-series may be obtained, through parsing of the system log, for each resource type that may be considered.

In Step 404, for each background service task duration interval (defined in Step 400), a future availability of backup storage system resources is estimated. That is, in one embodiment of the invention, an available (or idle) amount or percentage of a selected resource type may be projected for each background service task duration interval. Further, each projected value (i.e., available amount or percentage of the selected resource type) may be estimated based on the historical time-series (obtained in Step 402) in conjunction with a known forecasting algorithm such as, for example, a probabilistic weighted fuzzy time-series (PWFTS) algorithm. PWFTS is a probabilistic forecasting algorithm, which considers fuzzy, and stochastic patterns on data (e.g., the historical time-series), to produce prediction intervals (or probability distributions). Details outlining the implementation of the PWFTS algorithm are outside the scope of embodiments of the invention and, therefore, will not be covered herein.

In Step 406, a forecast time-series is generated from the future availability of backup storage system resources for each background service task duration interval (estimated in Step 404). In one embodiment of the invention, the forecast time-series may represent a series of values indexed in a specified future time order, which spans the background service task duration (partitioned in Step 402). Further, each value may capture an amount or percentage of backup storage system resources projected to be available at a corresponding future point of time. When multiple backup storage system resource types are considered, a forecast time-series may be generated for each backup storage system resource type that may be considered.

Figure 5:
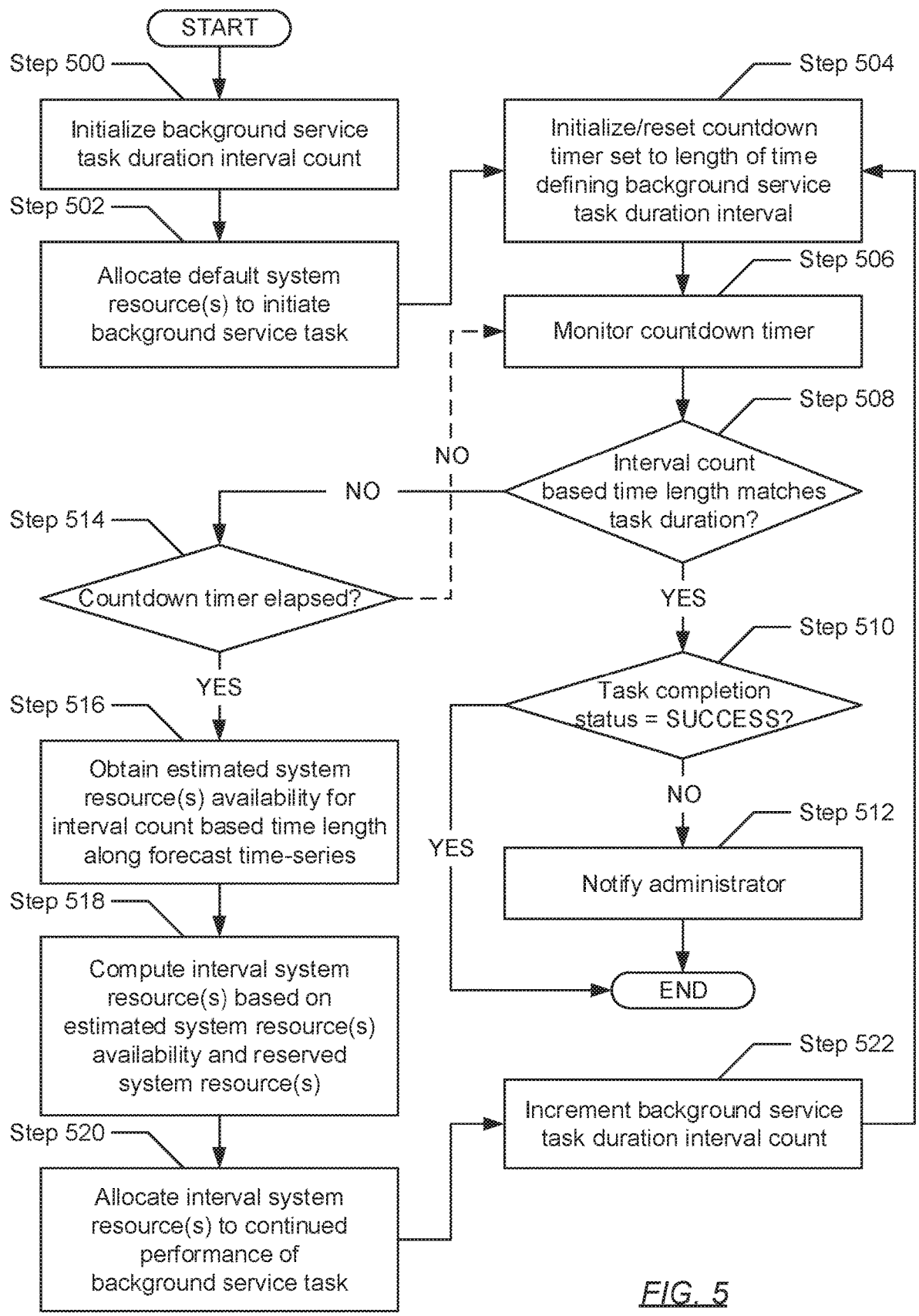
FIG. 5 shows a flowchart describing a method for regulating an allocation of system resources in accordance with one or more embodiments of the invention.

FIG. 5 shows a flowchart describing a method for regulating an allocation of system resources in accordance with one or more embodiments of the invention. The various steps outlined below may be performed by the dynamic resource allocator residing on the backup storage system (see e.g., FIG. 1). Further, while the various steps in the flowchart are presented and described sequentially, one of ordinary skill will appreciate that some or all steps may be executed in different orders, may be combined or omitted, and some or all steps may be executed in parallel.

Turning to FIG. 5, in Step 500, a background service task duration interval count is initialized. In one embodiment of the invention, the background service task duration interval count may refer to a register or a logical, counter-like variable that may be used to track the transpired number of background service task duration intervals (described above—see e.g., FIG. 4). More specifically, the background service task duration interval count may increase (or increment) the stored value therein by one as the length of time, representative of a background service task duration interval, elapses throughout the execution of the instant method. Further, initialization of the background service task duration interval count may entail storing an initial value of zero in the aforementioned register or logical, counter-like variable.

In Step 502, a default amount or percentage of backup storage system resources is allocated to initiate a given background service task. In one embodiment of the invention, the aforementioned default amount or percentage may refer to a value prescribed by a backup storage system administrator, or an average minimum value required to invoke most, if not all, background service tasks that may be performed on the backup storage system. Furthermore, the allocated default amount or percentage of backup storage system resources may be directed to a selected resource type (described above see e.g., FIG. 4) or multiple selected resource types.

In Step 504, a countdown timer is initialized (during a first iteration of the instant method) or reset (during subsequent iterations of the instant method). In one embodiment of the invention, the countdown timer may refer to a physical or virtual clock that may be used to track the decrease or decrement of time from a specified time value (e.g., a span of time defining an individual background service task duration interval). Zeroing of the countdown timer may indicate that the length of time, representative of a background service task duration interval, has transpired.

In Step 506, the countdown timer (initialized or reset in Step 504) is monitored. In Step 508, a determination is made as to whether the overall elapsed time, based on the current background service task duration interval count, matches or exceeds the background service task duration. By way of an example, the overall elapsed time, based on a current background service task duration interval count of two and a background service task duration interval of thirty minutes, may be expressed as the product of these two factors (i.e., in this case, 2×30 minutes=60 minutes or 1 hour). Accordingly, in one embodiment of the invention, if it is determined that the aforementioned overall elapsed time matches or exceeds the background service task duration, then the process proceeds to Step 510. On the other hand, in another embodiment of the invention, if it is alternatively determined that the aforementioned overall elapsed time falls short of the background service task duration, then the process alternatively proceeds to Step 514.

In Step 510, after determining (in Step 508) that the above-mentioned overall elapsed time matches or exceeds the background service task duration, a determination is made as to whether a completion status, describing a current operational state of the background service task, indicates that the background service task successfully completed. In one embodiment of the invention, if it is determined that the background service task has successfully completed, then the process ends. On the other hand, in another embodiment of the invention, if it is alternatively determined that the background service task has failed to complete, then the process alternatively proceeds to Step 512.

In Step 512, after determining (in Step 510) that the background service task has failed to complete, a backup storage system administrator is notified of the failure. In one embodiment of the invention, notification of the backup storage system administrator may entail the generation and delivery of an electronic mail (or e-mail) message, a short message service (SMS) text message, a dashboard (i.e., management user interface) prompt and/or alert, or a combination thereof.

In Step 514, after alternatively determining (in Step 508) that the above-mentioned overall elapsed time falls short of the background service task duration, a determination is made as to whether the countdown timer (initialized or reset in Step 504) has elapsed—i.e., the stored value therein has arrived at a zero value. In one embodiment of the invention, if it is determined that the stored time value of the countdown tinier is zero, then the process proceeds to Step 516. On the other hand, if it is alternatively determined that the stored time value of the countdown timer is non-zero, then the process alternatively proceeds to Step 506, where the monitoring of the countdown timer continues.

In Step 516, after determining (in Step 514) that the countdown timer (initialized or reset in Step 504) has elapsed, a value depicted in a forecast time-series (described above—see e.g., FIG. 2 or 4), which corresponds to the current background service task duration interval count, is obtained. In one embodiment of the invention, the obtained forecast time-series value may capture an amount or percentage of a selected backup storage system resource type projected to be available at the current overall elapsed time (described above) of the background service task since its initiation (in Step 502). Alternatively, when multiple resource types are considered, a value from a forecast time-series, respective to each resource type that may be considered and corresponding to the current background service task duration interval count, may be obtained.

In Step 518, an interval amount or percentage of backup storage system resources is computed. In one embodiment of the invention, the aforementioned interval amount or percentage may refer to a difference value derived from the forecast time-series value(s) (obtained in Step 516) and a reserved amount or percentage of backup storage system resources. The latter may represent a subset of a selected resource type, or subsets of multiple selected resource types, which may be reserved and provisioned to support other backup storage system operations while the background service task is executing. Further, the aforementioned reserved amount or percentage may refer to a value prescribed by a backup storage system administrator.

In Step 520, backup storage system resources, matching the above-mentioned interval amount or percentage (computed in Step 518), are allocated. Specifically, in one embodiment of the invention, the interval amount(s) or percentage(s) of a selected resource type, or multiple selected resource types, is/are directed to the continued performance of the background service task. Accordingly, the backup storage system resources, allocated to the background service task, may change based on and may be proportional to the predicted availability of these backup storage system resources reflected in the forecast time-series. In Step 522, the background service task duration interval count (initialized in Step 500 or updated in Step 522 during a previous iteration of the instant method) is incremented. Thereafter, the process proceeds to Step 504, where the countdown timer may be reset.

Figure 6:
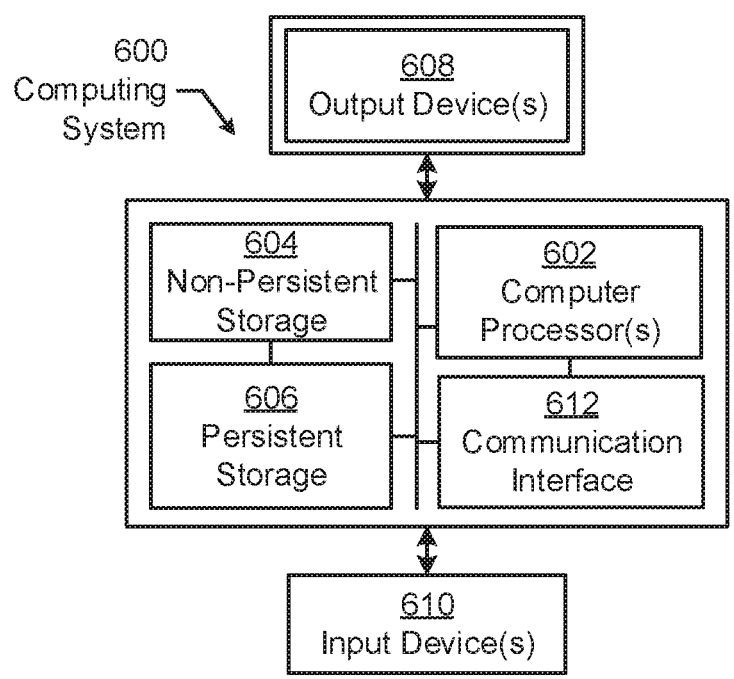
FIG. 6 shows a computing system in accordance with one or more embodiments of the invention.

FIG. 6 shows a computing system in accordance with one or more embodiments of the invention. The computing system (600) may include one or more computer processors (602), non-persistent storage (604) (e.g., volatile memory, such as random access memory (RAM), cache memory), persistent storage (606) (e.g., a hard disk, an optical drive such as a compact disk (CD) drive or digital versatile disk (DVD) drive, a flash memory, etc.), a communication interface (612) (e.g., Bluetooth interface, infrared interface, network interface, optical interface, etc.), input devices (610), output devices (608), and numerous other elements (not shown) and functionalities. Each of these components is described below.

In one embodiment of the invention, the computer processor(s) (602) may be an integrated circuit for processing instructions. For example, the computer processor(s) may be one or more cores or micro-cores of a central processing unit (CPU) and/or a graphics processing unit (GPU). The computing system (600) may also include one or more input devices (610), such as a touchscreen, keyboard, mouse, microphone, touchpad, electronic pen, or any other type of input device. Further, the communication interface (612) may include an integrated circuit for connecting the computing system (600) to a network (not shown) (e.g., a local area network (LAN), a wide area network (WAN) such as the Internet, mobile network, or any other type of network) and/or to another device, such as another computing device.

In one embodiment of the invention, the computing system (600) may include one or more output devices (608), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (602), non-persistent storage (604), and persistent storage (606). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for intelligently provisioning system resources, comprising:
   identifying a background service task yet to be performed;
   predicting a background service task duration for completing the background service task;
   generating a forecast time-series projecting a future availability of a system resource spanning the background service task duration,
      wherein generating the forecast time-series comprises:
         partitioning the background service task duration into a plurality of background service task duration intervals;
         parsing a system log to obtain a historical time-series recording a past availability of the system resource spanning a specified time duration;
         for each background service task duration interval of the plurality of background service task duration intervals:
            estimating, for the background service task duration interval, the future availability of the system resource using the historic al time-series and a second forecasting algorithm; and
         forming the forecast time-series using the future availability of the system resource for the plurality of background service task duration intervals in chronological order,
         wherein the second forecasting algorithm is a probabilistic weighted fuzzy time-series (PWFTS) algorithm; and
   regulating, based on the forecast time-series, an allocation of the system resource in support of performing the background service task.

2. The method of claim 1, wherein predicting the background service task duration, comprises:
   obtaining a first feature set based on historical records relevant to the background service task;
   generating a predictive model using the first feature set and a first forecasting algorithm;
   obtaining a second feature set based on a background service task configuration associated with the background service task; and
   predicting the background service task duration using the second feature set and the predictive model.

3. The method of claim 2, wherein the first forecasting algorithm is a random forest regression algorithm.

4. The method of claim 1, wherein regulating the allocation of the system resource, comprises:
   allocating a default percentage of the system resource to initiate the background service task;
   monitoring a timer tracking an elapsed time since an initiation of the background service task;
   making a first determination that the elapsed time matches a first background task duration interval; and
   allocating, based on the first determination, a first interval percentage of the system resource in support of performing the background service task.

5. The method of claim 4, wherein the first interval percentage of the system resource comprises a difference between the future availability of the system resource estimated for the first background service task duration interval and a reserved percentage of the system resource.

6. The method of claim 4, further comprising:
   making a second determination that the elapsed time matches a second background task duration interval; and
   allocating, based on the second determination, a second interval percentage of the system resource in support of performing the background service task.

7. The method of claim 1, wherein the system resource is a central processing unit (CPU).

8. The method of claim 1, wherein the background service task is to be performed on a backup storage system.

9. The method of claim 8, wherein the background service task is one selected from a group of operations consisting of performing garbage collection on the backup storage system, migrating data from the backup storage system to a cloud computing environment, and replicating data between storage devices of the backup storage system.

10. A system, comprising:
    a computer processor; and
    a dynamic resource allocator executing on the computer processor, and configured to:
       identify a background service task yet to be performed;
       obtain a prediction of a background service task duration for completing the background service task;
       generate a forecast time-series projecting a future availability of a system resource spanning the background service task duration,
          wherein generating the forecast time-series comprises:
             partitioning the background service task duration into a plurality of background service task duration intervals;
             parsing a system log to obtain a historical time-series recording a past availability of the system resource spanning a specified time duration;
             for each background service task duration interval of the plurality of background service task duration intervals:

estimating, for the background service task duration interval, the future availability of the system resource using the historical time-series and a second forecasting algorithm; and forming the forecast time-series using the future availability of the system resource for the plurality of background service task duration intervals in chronological order, wherein the second forecasting algorithm is a probabilistic weighted fuzzy time-series (PWFTS) algorithm; and regulate, based on the forecast time-series, an allocation of the system resource in support of performing the background service task.

11. The system of claim 10, further comprising:

a background service executing on the computer processor, and operatively connected to the dynamic resource allocator, wherein the background service task is performed by the background service using the regulated allocation of the system resource.

12. The system of claim 10, further comprising:

a task duration predictor executing on the computer processor, and operatively connected to the dynamic resource allocator, wherein the prediction of the background service task duration is performed and delivered by the task duration predictor.

13. A non-transitory computer readable medium (CRM) comprising computer readable program code, which when executed by a computer processor, enables the computer processor to:

identify a background service task yet to be performed;

predict a background service task duration for completing the background service task;

generate a forecast time-series projecting a future availability of a system resource spanning the background service task duration, wherein generating the forecast time-series comprises:

partitioning the background service task duration into a plurality of background service task duration intervals;

parsing a system log to obtain a historical time-series recording a past availability of the system resource spanning a specified time duration;

for each background service task duration interval of the plurality of background service task duration intervals:

estimating, for the background service task duration interval, the future availability of the system resource using the historical time-series and a second forecasting algorithm; and forming the forecast time-series using the future availability of the system resource for the plurality of background service task duration intervals in chronological order, wherein the second forecasting algorithm is a probabilistic weighted fuzzy time-series (PWFTS) algorithm; and regulate, based on the forecast time-series, an allocation of the system resource in support of performing the background service task.

14. The non-transitory CRM of claim 13, further comprising computer readable program code, which when executed by the computer processor, enables the computer processor to:

predict the background service task duration, by:

obtaining a first feature set based on historical records relevant to the background service task;

generating a predictive model using the first feature set and a first forecasting algorithm;

obtaining a second feature set based on a background service task configuration associated with the background service task; and predicting the background service task duration using the second feature set and the predictive model.

15. The non-transitory CRM of claim 14, wherein the first forecasting algorithm is a random forest regression algorithm.

16. The non-transitory CRM of claim 13, further comprising computer readable program code, which when executed by the computer processor, enables the computer processor to:

regulate the allocation of the system resource, by:

allocating a default percentage of the system resource to initiate the background service task;

monitoring a timer tracking an elapsed time since an initiation of the background service task;

making a first determination that the elapsed time matches a first background task duration interval; and allocating, based on the first determination, a first interval percentage of the system resource in support of performing the background service task.

\* \* \* \* \*